Dec. 12, 1961  B. W. CORSON, JR  3,012,400
NOZZLE
Filed May 23, 1960

INVENTOR
BLAKE W. CORSON, JR.

BY

ATTORNEYS

United States Patent Office 3,012,400
Patented Dec. 12, 1961

3,012,400
NOZZLE
Blake W. Corson, Jr., Newport News, Va., assignor to the United States of America as represented by the Administrator of the National Aeronautics and Space Administration
Filed May 23, 1960, Ser. No. 31,242
6 Claims. (Cl. 60—35.6)
(Granted under Title 35, U.S. Code (1952), sec. 266)

The invention described herein may be manufactured and used by or for the Government of the United States of America for governmental purposes without the payment of any royalties thereon or therefor.

This invention relates generally to a peripheral flow exhaust nozzle for a reaction motor and more particularly to the configuration of an axial plug centrally positioned within an outer peripheral exhaust nozzle wall to define a peripheral exhaust outlet.

The invention is considered to be particularly useful in the field of supersonic aircraft and rocket propulsion. The present day conventional jet motor for a typical aircraft installation, for example, generally includes an air inlet, a compressor, fuel injectors and burners, a turbine, tail pipe, and exhaust nozzle. The motor is essentially a gas generator, and the function of the tail pipe and the exhaust nozzle is to direct the flow of exhaust gases issuing from the motor in a way to convert into useful thrust as great a portion as possible of the energy stored in these gases in the form of weight flow, pressure, and heat.

In the case of subsonic aircraft with motors designed to operate at a pressure ratio, defined as the ratio of jet total pressure to external ambient pressure, in the range of 1.9 to 4.0 or 5.0, a simple convergent nozzle is sufficient to convert flow energy to useful thrust with a high degree of efficiency. The simple convergent nozzle consists merely of a tailpipe having an upstream diameter substantially equal to or slightly less than the motor diameter, which tapers in a downstream direction with an internal conical or convexly curved surface toward the nozzle, which usually has a diameter approximately one half that of the motor. In the case of supersonic aircraft provided with jet motors designed to operate at pressure ratios of 8.0 or greater, it is generally advantageous to use a convergent-divergent nozzle to develop high motor efficiency. In nozzles of this type the convergent section and the nozzle throat section, or region of minimum cross-sectional area, are generally similar to the simple convergent nozzle, with the throat section of the convergent-divergent nozzle being of the same relative size as the jet exit of the simple convergent nozzle. Downstream of the throat section of the convergent-divergent nozzle, the wall thereof diverges and the cross-sectional area of the nozzle increases throughout the length of the divergent section. A subsonic flow upstream of the converging section of the nozzle is accelerated therein, and in the throat section of the nozzle the Mach number of the flow is theoretically equal to 1. It is well known in the art that the Mach number attainable in the divergent section of the nozzle downstream of the throat section is a function of the increase in area, which is accompanied by expansion and a consequent decrease in static pressure of the flowing gas, and the acceleration to supersonic speeds of the flowing gas in the divergent section of the nozzle produces greater motor thrust. An alternative form of the convergent-divergent nozzle is the annular nozzle provided with a central, essentially conical or isentropic plug, such as the nozzle disclosed in A. A. Griffith's U.S. Patent No. 2,683,962. In this type of convergent-divergent nozzle, the plug extends downstream from the outer annular wall of the jet exit along a curved path usually precisely calculated for optimum operation of the motor at a specified value of jet pressure ratio, and provides a physical boundary for the inner surface of the annular jet stream. Since the actual outer diameter of the annular type of convergent-divergent nozzle may be varied considerably without adversely affecting the efficiency of the nozzle, the use thereof is preferred in supersonic aircraft installations to produce nacelle or motor casing designs having superior aerodynamic characteristics. This result was obtained by making the annular nozzle outer diameter substantially equal to or only slightly smaller than the diameter of the motor. The nacelle or casing afterbody between the motor and the nozzle thus may be made substantially cylindrical or only slightly boattailed, thereby eliminating the low pressure drag developed on a sharply boattailed afterbody by an airflow moving thereover. The afterbody configuration associated with this type of exhaust nozzle may also be shorter in length than that of the conventional convergent-divergent nozzle afterbody configuration, thereby diminishing skin friction drag. Exhaust nozzle base drag was also minimized by making the outer diameter of the annular nozzle substantially equal to the diameter of the nacelle or motor casing afterbody. Although the present day annular exhaust nozzle performs its intended function in a generally satisfactory manner, it has been found that the configuration of the conventional axial or isentropic plug, which extends downstream from the nozzle and defines an inner physical boundary for the annular jet, contributes substantially to thrust loss due to skin friction as the jet stream moves over the surface thereof. It has also been found that this type of prior art annular nozzle is not readily adaptable to the development of increased thrust by external afterburning, since the shape of the jet stream issuing thereform is generally such as to prevent the ready intermixture of afterburner fuel therewith.

Accordingly, it is an object of the present invention to provide a new and improved peripheral exhaust nozzle for a reaction motor capable of generating thrust with a high degree of efficiency.

Another object of the instant invention is the provision of a new and improved peripheral exhaust nozzle for a reaction motor characterized by low internal thrust loss.

A still further object of the present invention is the provision of a new and improved reaction motor peripheral exhaust nozzle of simplified construction.

Another still further object of the instant invention is to provide a new and improved peripheral jet exhaust nozzle for a reaction motor particularly adapted for utilization with external afterburning.

According to the present invention, the foregoing and other objects are attained by providing a peripheral exhaust nozzle for a reaction motor including a peripheral outer wall adjacent the end of the tailpipe of the motor and which terminates in an inwardly curved or tapered lip defining the outer periphery of the jet exit. The nozzle also includes a plug axially positioned with respect to the peripheral outer wall having an upstream outer surface curved toward the lip of the outer wall and defining the inner periphery of the exhaust nozzle. The downstream base of the plug is preferably positioned somewhat forwardly of the lip of the outer wall of the jet exit, and the plug base facing downstream is formed with an essentially concave surface which includes means for injecting afterburner fuel in the region adjacent thereto.

A more complete appreciation of the invention and many of the attendant advantages thereof will be readily apparent as the same becomes better understood by reference to the following detailed description when considered in connection with the accompanying drawing wherein.

Figure 1:
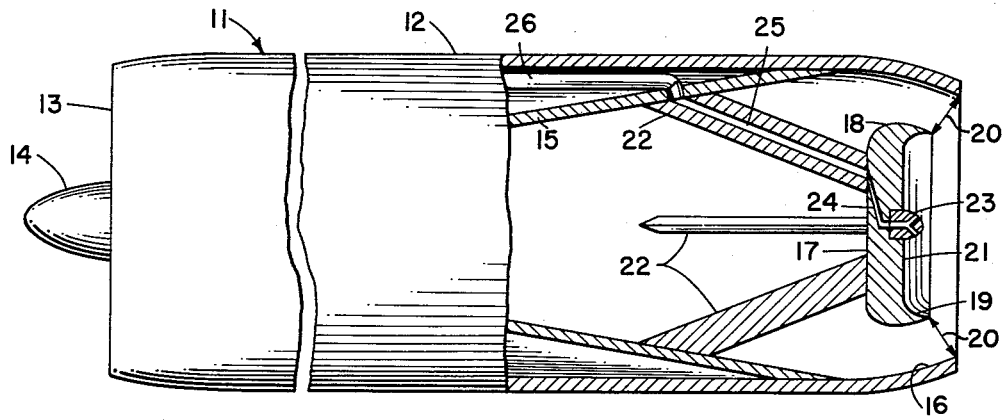
FIG. 1 is an elevational view of a reaction motor partially in section and showing the exhaust nozzle of the motor in the sectionalized portion thereof.

Referring now more particularly to the drawing, wherein like reference numerals designate identical parts throughout the several views, and more particularly to FIG. 1, there is shown a reaction motor of the turbojet type, generally designated by the reference numeral 11. Motor 11 is enclosed within a casing 12 substantially cylindrical in form, and is provided with an annular frontal air inlet 13. Motor 12 is also provided with a conventional compressor element 14, the forward end of which is shown projecting forwardly from casing 12 through air inlet 13, and also includes conventional fuel injectors and burners, and a conventional turbine, these parts not being shown. A conical tailpipe element 15, which increases in diameter in a rearwardly direction, extends rearwardly within casing 12 from the combustion chamber of the motor, not shown. The after end of tailpipe 15 is positioned a short distance forward of the after end of casing 12, and the diameter of the tailpipe at this point equals the inner diameter of casing 12. The after end of tailpipe 15 is smoothly faired into the inner surface of casing 12 and is connected thereto by suitable means, not shown, such as welds or the like. The short section of casing 12 positioned abaft the after end of tailpipe 15 is inwardly curved to form a lip portion 16; the arc defined by lip 16 preferably subtending an angle on the order of about 20 degrees. A circular plug member 17 is axially positioned completely within the casing 12; the aftermost portion thereof being spaced somewhat rearwardly of the longitudinal midpoint of the lip 16. The upstream surface of plug 17 in the peripheral region thereof is outwardly curved in the downstream direction at 18 to smoothly direct the flow of exhaust gases moving down tailpipe 15 into the annular exhaust nozzle. The exhaust nozzle gap, or jet exit, between the aftermost edges of lip 16 and plug 17 is the region of minimum physical area in the flow system, and the geometrical shape of this region is of the form of the conical surface of a truncated cone generated from an apex located on the axial centerline of the motor forward of the annular exhaust nozzle. More generally, it may also be said that any line such as a line 20 as illustrated in FIG. 1 coplanar with the surface of the jet exit which, when extended, would also intersect the axial centerline of motor 11 at a point upstream of the downstream peripheral terminus of plug 17, will intersect the motor axial centerline at a point common with the point of intersection of an extension of any other similar line 20 therewith. Further, any line normal to the surface of the jet exit a given distance between lip 16 and plug 17 will intersect the axial centerline of motor 11 at a common point downstream of the motor exhaust nozzle, and the angle between these lines and the motor centerline may be defined as the discharge angle of the nozzle. The downstream face or base of plug 17 is concavely formed, or dish-shaped, and includes rounded inner side walls 19 and a substantially flat center portion 21. Faired strut elements 22 are interconnected between an upsteram portion of plug 17 and the inner wall of tailpipe 15, and constitute a spider for maintaining plug 17 in its axially centered position in the exhaust nozzle. A conventional fuel injector element 23 is positioned at the center of the flat central portion 21 of the downstream base of plug 17, and includes a downstream tapered conical or hemispheroidal surface provided with a plurality of radially spaced flow ports normal thereto and communicable with an axial fluid conduit. A fluid conduit 24 is formed in plug 17 communicable with the axial conduit of element 23, and which is in turn communicable with a flow channel 25 provided in at least one strut element 22. A fuel feed line 26 is connected to the other end of channel 25 through the wall of tailpipe 15, and afterburning fuel passing therefrom may flow through channel 25 into conduit 24 and thence into the fuel injector 23 for discharge through the flow ports provided therein.

Figure 2:
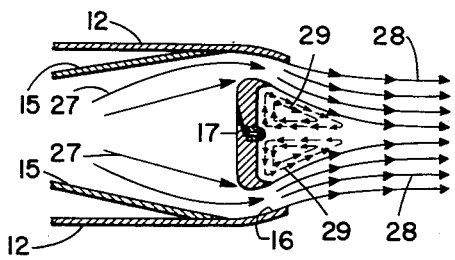
FIG. 2 is a sectional longitudinal representation of the structure of the nozzle of FIG. 1 showing the flow pattern of exhaust gases therethrough.

The operational flow characteristics of the hereinbefore described annular exhaust nozzle are schematically illustrated in FIG. 2 of the drawing. Arrows 27 indicate the primary flow moving through tailpipe 15 toward the exhaust nozzle. The primary jet issues from the exhaust nozzle as an annular jet, indicated by streamlines 28, which initially converge toward points on the axial centerline of motor 11 extended downstream of the exhaust nozzle. The region aft of the downstream base of plug 17 and surrounded by the annular jet might normally be regarded as a region of dead flow, and it is this region that is usually occupied by the portion of the plug in the prior art annular exhaust nozzle extending downstream therefrom and providing a physical boundary for the inner surface of the annular jet stream. In the nozzle of the present invention, however, a vortex ring flow becomes established in this region, as indicated by the arrows 29. On the outer surface of the vortex ring the flow is downstream and parallel to that on the inner surface of the annular jet and the velocities of the adjacent flows are nearly equal. The flow in the interior part of the vortex ring moves upstream, with respect to the primary flow, impinges on the flat center portion 21 of the concave base of plug 17 near the center thereof, is deflected radially outwardly thereover, and is then deflected along the rounded side wall 19 of the concave base to move downstream parallel to the streamlines 28 of the annular jet. The concave base of plug 17 assists in the establishment and maintenance of the vortex ring flow within the annular jet, due to the shape thereof.

The significance of the vortex ring flow within the annular jet will now be described. The law of continuity of mass flow demands that the streamlines 28 of the annular primary jet ultimately flow parallel to the axis of symmetry of the exhaust nozzle, which is also the axial centerline of the motor 11. Consequently, the jet streamlines 28, directed initially from the annular nozzle with a component of velocity toward the axis of symmetry, must be redirected axially downstream. This turning of the convergent annular jet into a purely axial flow requires the average static pressure of the vortex ring flow contained at the base of the annular jet to be greater than the average static pressure on the external boundary of the annular primary jet. Since the average static pressure in the vortex ring flow is exerted directly on the downstream base of plug 17, the force required to redirect the convergent annular jet to an axial direction is sensed by the downstream base of the plug as thrust. This thrust on the base of plug 17, however, does not imply the acquisition of something for nothing, since the thrust exerted on the base of plug 17 simply constitutes recovery of that portion of the primary jet thrust lost by initially ejecting the primary flow from the exhaust nozzle at an angle to the axis of symmetry. It will now be apparent that the annular exhaust nozzle described hereinbefore is simpler in design and construction than the conventional supersonic annular exhaust nozzle having an isentropic plug center body, and is more efficient, since thrust losses due to skin friction on the concave downstream base of plug 17 are less than corresponding losses on the conventional plug, which throughout its length downstream of the annular nozzle is in contact with the inner surface of the annular primary jet.

The peripheral nozzle configuration of the present invention hereinbefore described is further considered to be particularly adapted to the use of external afterburning to increase thrust. If the exhaust gases in the annular primary jet contain free oxygen, which is generally the case, external afterburning can be accomplished by introducing fuel into the region just downstream of the concave base of plug 17 through conventional fuel injector element 23. The vortex ring flow will become so rich in fuel that burning will occur primarily only at the interface between the external surface of the vortex ring and the inner surface of the annular jet, and the highly heated products of combustion will proceed downstream in the jet. Thrust increase due to external afterburning stems from rapid expansion and acceleration of the primary jet in the burning process, which increases the average static pressure of the vortex ring flow, and which in turn is sensed as increased thrust on the concave downstream base of plug 17. Since the very hot products of afterburning are nowhere in contact with structural components of the annular exhaust nozzle, the use of special cooling means or special heat resistant materials is not generally required in the design and fabrication of the exhaust nozzle. Furthermore, the use of external afterburning eliminates the necessity of providing the adjustable primary jet exit required for conventional afterburning at high pressure in a reaction motor tailpipe.

The reaction motor peripheral exhaust nozzle hereinbefore described shares with the prior art type of annular nozzle a higher ratio of external periphery to primary jet exit area than conventional convergent-divergent nozzles, thereby promoting more rapid mixing of the external airstream flowing over the motor, when carried aloft by an aircraft, with the gases of the jet. Since a reduced level of total noise is generally associated with rapid mixing of jet gases and external flow, it is considered that the annular nozzle of the present invention will operate with less noise than a conventional jet producing the same thrust.

Figure 3:
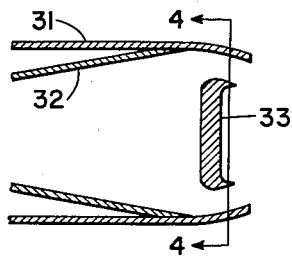
FIG. 3 is a sectional longitudinal representation of an alternative embodiment of the peripheral exhaust nozzle.
Figure 4:
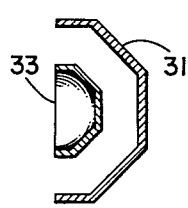
FIG. 4 is a sectional view taken along the line 4—4 of FIG. 3.
Figure 5:
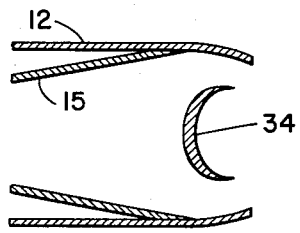
FIGS. 5 and 6 are sectional longitudinal representations of two other alternative embodiments of the exhaust nozzle.
Figure 6:
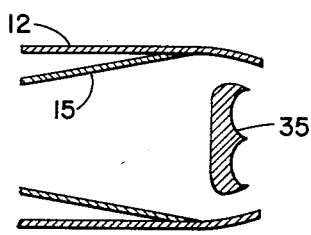

The foregoing description of the peripheral exhaust nozzle of the present invention has been presented on the basis of an axisymmetric configuration; that is, cross-sections through the tailpipe, motor casing, central plug, and the exhaust nozzle are circular. While it is believed that optimum results are produced by the axially symmetric configuration, other configurations are also considered within the scope of the invention. An alternative embodiment of the exhaust nozzle hereinbefore described is represented in fragmentary, longitudinal section in FIG. 3 of the drawing, and includes a motor casing 31, tailpipe 32, and central plug member 33 similar to the casing 12, tailpipe 15, and central plug 17, respectively, of motor 11. Casing 31 and plug 33, as indicated in FIG. 4, are octagonal in cross-section, as is tailpipe 32, which is not shown in FIG. 4 in the interest of clarity. These elements may also be of other desired polygonal sections. Further alternative embodiments of the axisymmetric central plug of the present invention are represented in longitudinal cross-section in FIGS. 5 and 6 of the drawing, which may be directly substituted in motor 11 for the plug member 17. Plug member 34, FIG. 5, is provided with a convexly curved upstream face, and a concave downstream base having the shape of a hemispheroid, which may be hemispherical. Plug member 35, FIG. 6, is provided with an upstream face substantially similar to the upstream face of plug member 17, and a concave downstream base having the shape of a semitoroid with no central opening. Plug members 33, 34, and 35 may also be provided with afterburner fuel injectors and feed means similar to that of plug 17, and similarly positioned thereon.

While the various peripheral nozzle configurations discussed hereinbefore differ somewhat in configuration, they are essentially similar in that each is provided with a plug having a smoothly contoured upstream face to form the inner surface of a converging peripheral channel and which is free of discontinuities in surface curvature which might cause disturbances in the primary flow through the motor tailpipe, and these configurations are also similar in that each of these plugs is also provided with an essentially concave downstream base positioned forwardly of the terminal lip of the outer nozzle wall amenable to the formation and maintenance of a vortex ring type of flow in the region bounded by the downstream base and the inner surface of the peripheral jet issuing from the exhaust nozzle. Within these limitations, it will be apparent that the various peripheral nozzle configurations herein illustrated and described have been disclosed only by way of illustration, and not limitation, and that the invention contemplates the successful utilization of these and other specific peripheral nozzle configurations operable on the same principle to obtain similar results.

Obviously, many modifications and variations of the present invention are possible in the light of the above teachings. It is therefore to be understood that within the scope of the appended claims the invention may be practiced otherwise than as specifically described.

What is claimed as new and desired to be secured by Letters Patent of the United States is:

1. A peripheral exhaust nozzle having a centroidal axis for use in a reaction motor to direct peripheral motor exhaust gas flow in a downstream direction collinearly with said axis, comprising a peripheral wall centroidally positioned with respect to said axis and defining a physical outer boundary for said peripheral flow, said peripheral wall including a downstream terminal edge having at least an inner surface converging in the direction of said flow, a plug member centroidally positioned within said peripheral wall and having a corresponding edge spaced inwardly of said peripheral wall to define a physical inner boundary for said peripheral flow, said plug having a downstream peripheral terminus positioned upstream of said peripheral wall terminal edge and defining therewith a jet exit having a shape such that any line coplanar with the surface of said jet exit and also intersecting said centroidal axis will intersect said axis at a point upstream of the downstream peripheral terminus of said plug common with the point of intersection of any other similar line with said axis, said downstream peripheral plug terminus defining the periphery of a plug downstream base portion having a substantially concave surface provided with means for injecting fuel into the downstream region adjacent said base portion.

2. The exhaust nozzle as defined in claim 1, wherein said shape of said jet exit is of the form of the side wall of a truncated polygonal pyramid generated from a vertex located on said axis upstream of the downstream peripheral terminus of said plug.

3. The exhaust nozzle as defined in claim 1, wherein said shape of said jet exit is of the form of the conical surface of a truncated cone generated from an apex located on said axis upstream of the downstream peripheral terminus of said plug.

4. The exhaust nozzle as defined in claim 3, wherein said concave base surface comprises a substantially flat central portion and a curved side wall.

5. The exhaust nozzle as defined in claim 3, wherein said concave base surface has the shape of a hemispheroid.

6. The exhaust nozzle as defined in claim 3, wherein said concave base surface has the shape of a semitoroid not having a central opening.

References Cited in the file of this patent

UNITED STATES PATENTS

| 2,914,912 | Woll | Dec. 1, 1959 |
| 2,931,170 | Mittelstaedt | Apr. 5, 1960 |

FOREIGN PATENTS

| 56,829 | France | July 30, 1952 |
| | (1st addition to No. 931,296) | |
| 767,970 | Great Britain | Feb. 13, 1957 |